United States Patent
Huang et al.

(10) Patent No.: US 8,106,543 B2
(45) Date of Patent: Jan. 31, 2012

(54) SOLAR GENERATOR AND SOLAR CELL THEREOF DISTRIBUTIVELY PERFORMING MAXIMUM POWER POINT TRACKING

(75) Inventors: Chao-Jui Huang, Wugu Township, Taipei County (TW); Ben-Sheng Chen, Wugu Township, Taipei County (TW)

(73) Assignee: Chicony Power Technology Co., Ltd., Wugu Township, Taipei County (TW)

( * ) Notice: Subject to any disclaimer, the term of this patent is extended or adjusted under 35 U.S.C. 154(b) by 220 days.

(21) Appl. No.: 12/607,063

(22) Filed: Oct. 28, 2009

(65) Prior Publication Data
US 2011/0095613 A1    Apr. 28, 2011

(51) Int. Cl.
*G05F 3/06* (2006.01)
(52) U.S. Cl. ....................................................... 307/151
(58) Field of Classification Search .................... 307/151
See application file for complete search history.

(56) References Cited

U.S. PATENT DOCUMENTS
2010/0084924 A1*  4/2010  Frolov et al. ..................... 307/82
2010/0089442 A1*  4/2010  Beasley et al. ................ 136/255
* cited by examiner

*Primary Examiner* — Robert L. Deberadinis
(74) *Attorney, Agent, or Firm* — patenttm.us

(57) ABSTRACT

A solar generator distributively performing maximum power point tracking (MPPT) has a plurality of solar cell modules formed by electrically connecting multiple solar cells, and a power conversion and transmission unit electrically connected with two power output terminals of the solar cell module. Each of the solar cells has a solar chip having two DC power output terminals and an MPPT unit having two power input terminals electrically connected with the two DC power output terminals, and two power output terminals. The solar generator performs MPPT associated with each solar cell, thereby ensuring the output power of the entire system a maximum power. When performing MPPT in a conventional inverter, maximum power of each solar cell is effectively acquired.

12 Claims, 3 Drawing Sheets

SOLAR GENERATOR AND SOLAR CELL THEREOF DISTRIBUTIVELY PERFORMING MAXIMUM POWER POINT TRACKING

BACKGROUND OF THE INVENTION

1. Field of the Invention

The present invention is related to a solar generator and solar cell thereof, and more particularly to a solar generator and solar cell thereof distributively performing maximum power point tracking (MPPT).

2. Description of the Related Art

Currently, solar energy can be harnessed by directly storing heat in a solid, liquid or gas or using photovoltaics to convert to electric energy and store the electric energy in solar cells.

With reference to FIG. 3, conventional solar cells include single crystalline silicon solar cells, polycrystalline silicon solar cells, amorphous silicon thin-film solar cells, CIS/CIS solar cells, CdTe solar cells, GaAs solar cells and the like and usually comprise a substrate (70), and a lower electrode (71), an optoelectronic semiconductor layer (72), an anti-reflection film (73) and an upper electrode (74) sequentially formed on the substrate (70). Given the single crystalline silicon cell as an example, The optoelectronic semiconductor layer (72) has a P-type semiconductor layer (721) and an N-type semiconductor layer (722), and a P-N junction therebetween. When light casts onto the P-N junction, electron-hole pairs are generated in the optoelectronic layer (72) due to a photovoltaic effect. Due to diffusion and an electric field in the optoelectronic layer (72), the electrons of the electron-hole pairs move toward the N-type semiconductor layer (722), and holes are moved toward the P-type semiconductor layer (721). Therefore, DC power is outputted from the upper and lower electrodes (74, 71) electrically and respectively connected with the N-type semiconductor layer (722) and the P-type semiconductor layer (721). As each solar cell only outputs low voltage DC power, multiple solar cells are combined to form a solar cell module, and then multiple solar cell modules can be arranged to form a solar cell sub-array and multiple solar cell sub-arrays may be further arranged to form a solar cell array to provide DC power of a desired voltage. All solar cells in the solar cell module are electrically connected to each other through wiring. An inverter is adopted to convert the DC power outputted by the solar cell array into AC power for performing MPPT.

However, shadow, shelter, incident angle of sunlight or faulty solar cells all affect power generation efficiency of the solar cells in a solar cell array. Hence, when MPPT is performed associated with the power generated by all solar cells, a maximum power of each solar cell fails to be effectively acquired, thereby causing a lowered maximum output power of the entire system.

SUMMARY OF THE INVENTION

An objective of the present invention is to provide a solar generator distributively performing MPPT that ensures a maximum output power across an entire system.

To achieve the foregoing objective, the solar generator has a plurality of solar cell modules and a power conversion and transmission unit.

The plurality of solar cell modules are formed by electrically connecting multiple solar cells. Each of the solar cells has a solar chip and an MPPT unit.

The solar chip has two DC power output terminals. The MPPT unit has two power input terminals electrically connected with the two DC power output terminals, and two power output terminals.

The power conversion and transmission unit is electrically connected with two power output terminals of the solar cell module.

Another objective of the present invention is to provide a solar cell capable of performing MPPT. The solar cell has a substrate, a microelectronic semiconductor layer, a lower electrode, an optoelectronic semiconductor layer, an anti-reflection film, and an upper electrode.

The microelectronic semiconductor layer is formed on the substrate to constitute an MPPT unit and has two power input terminals and two power output terminals.

The lower electrode is formed on the microelectronic semiconductor layer and electrically connected with one power input terminal of the MPPT unit.

The optoelectronic semiconductor layer is formed on the lower electrode, and has a top layer and a bottom layer abutting the lower electrode and electrically connected therewith.

The anti-reflection film is formed on the top layer of the optoelectronic semiconductor layer.

The upper electrode is formed on the anti-reflection film, electrically connected with the top layer of the optoelectronic semiconductor layer, and electrically connected with the other power input terminal of the MPPT unit.

Given the above-mentioned structure, an MPPT unit is built in a solar cell to enhance the actual output power of the solar cell and prevent total output power drop caused by shadow, shelter, incident angle or damage in a solar cell module or a solar cell array.

DETAILED DESCRIPTION OF THE INVENTION

Figure 1:
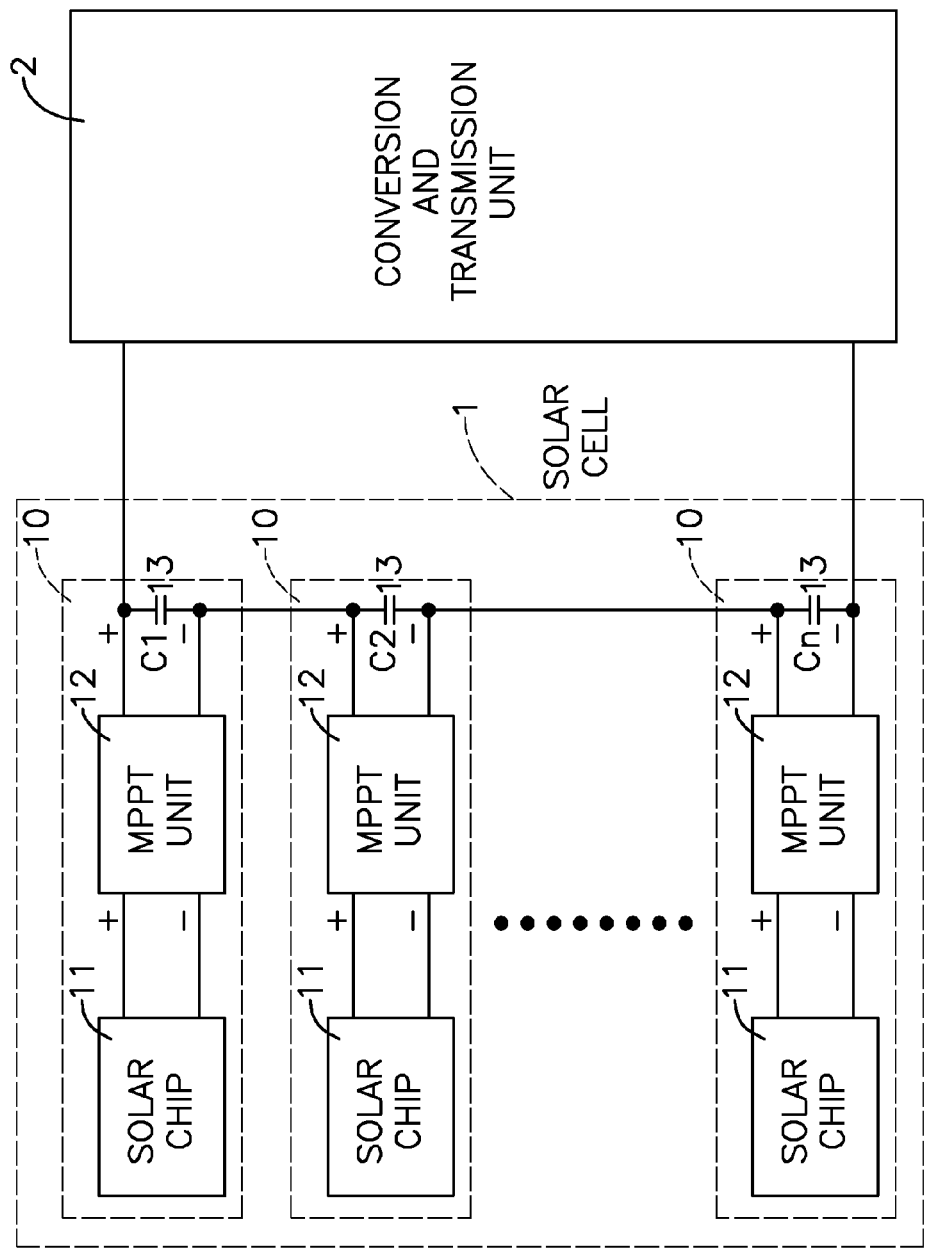
FIG. 1 is block diagram of a solar generator in accordance with the present invention.

With reference to FIG. 1, a solar generator of the present invention has at least one solar cell module (1) and a power conversion and transmission unit (2).

The at least one solar cell module (1) has multiple solar cells (10), and each solar cell (10) has a solar chip (11) and an MPPT unit (12). The solar chip (11) has two DC power output terminals. The MPPT unit (12) has two power input terminals and two power output terminals. The two power input terminals of the MPPT unit (12) are electrically connected with the two DC power output terminals of the solar chip (11). A capacitor (13) is connected across the two power output terminals of the MPPT unit (12). The solar chip (11) outputs DC power through the two DC power output terminals, and the MPPT unit (12) performs MPPT associated with the DC power outputted by the solar chip (11). Furthermore, a solar cell module (1) can be formed by series connection, parallel connection or series-parallel connection of multiple solar cells (10) so as to obtain a DC power having higher voltage and higher power. The solar cells (10) are serially connected through the capacitors (13) located at the power output terminals of the MPPT units (12), in which the capacitors (13) are used to balance or compensate energy. The solar cells (10) are serially connected to constitute two power output terminals of the solar cell module (1) electrically connected with two input terminals of the power conversion and transmission unit (2) for power conversion or transmission. The power conversion and transmission unit (2) may serve to convert or transmit DC power outputted by the solar cell module (1). Regarding performing the power conversion, the power conversion and transmission unit (2) may be a DC to DC converter performing DC to DC conversion associated with the output power of the solar cell module (1), or a DC to AC converter or an inverter converting DC power outputted by the solar cell module (1) into AC power to supply power to public power networks.

It is clear from the foregoing description that the solar generator of the present invention conducts MPPT on each solar cell (10) to enhance the actual output energy thereof and solve the issue of total output power drop caused by shadow, shelter, incident angle or damage occurring when conventional solar generators unitedly perform MPPT.

Figure 2:
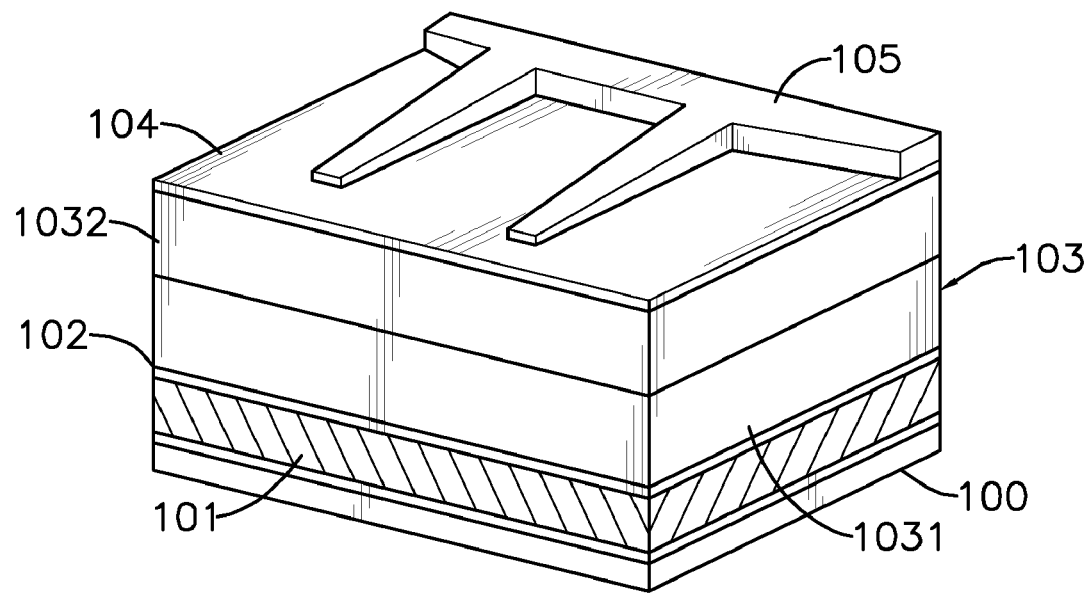
FIG. 2 is a schematic view of a solar cell in accordance with the present invention.
Figure 3:
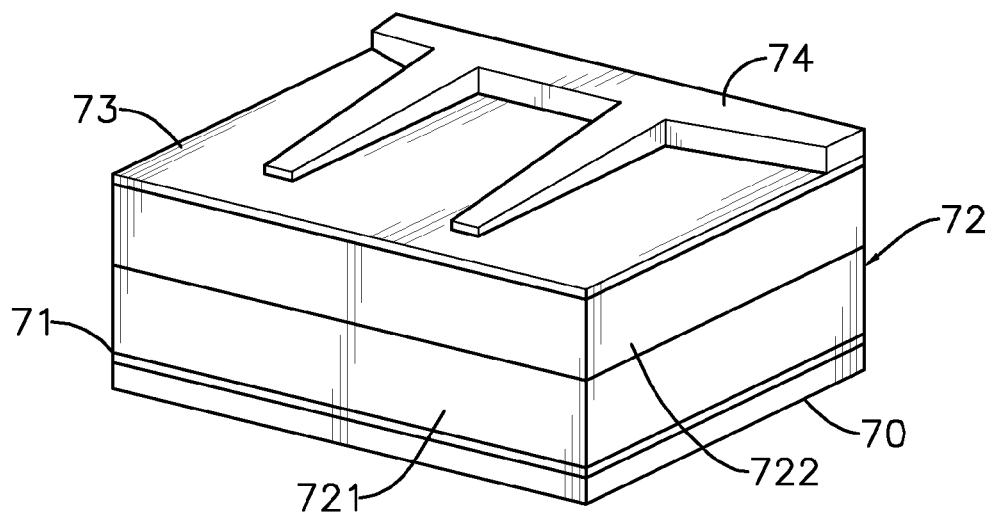
FIG. 3 is a schematic view of a conventional solar cell.

With reference to FIG. 2, the foregoing solar cell (10) has a base (100), a microelectronic circuit layer (101), a lower electrode (102), an optoelectronic semiconductor layer (103), an anti-reflection film (104) and an upper electrode (105).

The microelectronic circuit layer (101) is formed on the substrate (100) to form the aforementioned MPPT unit. As disclosed earlier, the MPPT unit has two power input terminals and two of power output terminals.

The lower electrode (102) is formed on the microelectronic semiconductor layer (101) by evaporating, electroplating, printing or other process, and is electrically connected with a power input terminal of the MPPT unit.

The optoelectronic semiconductor layer (103) is formed on the lower electrode (102) by gas diffusion, solid diffusion, ion implantation or the like. The solar cells formed by the optoelectronic semiconductor layer (103) may be single crystalline silicon solar cells, polycrystalline silicon solar cells, amorphous silicon thin-film solar cells, CIS/CIS solar cells, CdTe solar cells, GaAs solar cells, dye-sensitized cell and other types of cells. Given the single crystalline silicon cell as an example, the optoelectronic semiconductor layer (103) has a P-type semiconductor layer (1031) and an N-type semiconductor layer (1032). A P-N junction is formed therebetween, and the P-type semiconductor layer (1031) abuts the lower electrode and is electrically connected therewith.

The anti-reflection film (104) is formed on the N-type semiconductor layer (1032) of the optoelectronic semiconductor layer by PVD (physical vapor deposition) or CVD (chemical vapor deposition) or other method.

The upper electrode (105) is similar to the lower electrode (102), is formed on the anti-reflection film (104) by evaporating, electroplating, printing or other process, and is electrically connected with the N-type semiconductor layer (1032) of the optoelectronic semiconductor layer (103). The upper electrode (105) is electrically connected with another power input terminal of the MPPT unit through interlayer connection means, such as vias, or other electrical connection means.

In sum, the MPPT unit (12) is built in the solar cell (10) and is integrally formed with the solar cell (10). Besides, the capacitor is formed on the microelectronic semiconductor layer (101) and connected across the two power output terminals of the MPPT unit (12) to compensate the power. MPPT can be conducted on each solar cell individually, and all solar cells can be integrated to form a solar cell module. As such, total output power drop due to shadow, shelter, incident angle of sunlight or damage can be solved by the distributive MPPT approach.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A solar generator distributively performing maximum power point tracking (MPPT), comprising:
    a plurality of solar cell modules formed by electrically connecting multiple solar cells, each of the solar cells comprising:
    two DC power output terminals;
    a substrate;
    a microelectronic semiconductor layer formed on the substrate to constitute an MPPT unit, wherein the MPPT unit has two power output terminals and two power input terminals connected with the two DC power output terminals;
    a lower electrode formed on the microelectronic semiconductor layer and electrically connected with one power input terminal of the MPPT unit;
    an optoelectronic semiconductor layer formed on the lower electrode, and having a top layer and a bottom layer abutting the lower electrode and electrically connected therewith;
    an anti-reflection film formed on the top layer of the optoelectronic semiconductor layer; and
    an upper electrode formed on the anti-reflection film, electrically connected with the top layer of the optoelectronic semiconductor layer, and electrically connected with the other power input terminal of the MPPT unit; and
    a power conversion and transmission unit electrically connected with two power output terminals of the solar cell module.

2. The solar generator as claimed in claim 1, wherein each of the solar cells further comprises a capacitor electrically connected across the two power output terminals of the corresponding MPPT unit and electrically connected with other solar cells.

3. The solar generator as claimed in claim 2, wherein the power conversion and transmission unit is a DC to DC converter.

4. The solar generator as claimed in claim 2, wherein the power conversion and transmission unit is a DC to AC converter.

5. The solar generator as claimed in claim 2, wherein the power conversion and transmission unit is an inverter.

6. The solar generator as claimed in claim 2, wherein the solar cells are electrically connected by one of series connection, parallel connection and series-parallel connection.

7. The solar generator as claimed in claim 1, wherein the power conversion and transmission unit is a DC to DC converter.

8. The solar generator as claimed in claim 1, wherein the power conversion and transmission unit is a DC to AC converter.

9. The solar generator as claimed in claim 1, wherein the power conversion and transmission unit is an inverter.

10. The solar generator as claimed in claim 1, wherein the solar cells are electrically connected by one of series connection, parallel connection and series-parallel connection.

11. A solar cell, comprising:
    a substrate;

a microelectronic semiconductor layer formed on the substrate to constitute an MPPT unit having two power input terminals and two power output terminals;

a lower electrode formed on the microelectronic semiconductor layer and electrically connected with one power input terminal of the MPPT unit;

an optoelectronic semiconductor layer formed on the lower electrode, and having a top layer and a bottom layer abutting the lower electrode and electrically connected therewith;

an anti-reflection film formed on the top layer of the optoelectronic semiconductor layer; and an upper electrode formed on the anti-reflection film, electrically connected with the top layer of the optoelectronic semiconductor layer, and electrically connected with the other power input terminal of the MPPT unit.

12. The solar cell as claimed in claim 11, wherein the microelectronic semiconductor layer further comprises a capacitor formed thereon and electrically connected across the two power output terminals of the MPPT unit.

* * * * *